(12) United States Patent
Ueno et al.

(10) Patent No.: US 11,440,137 B2
(45) Date of Patent: Sep. 13, 2022

(54) LASER PEENING DEVICE AND LASER PEENING METHOD

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Souichi Ueno, Ota (JP); Akihiro Tsuji, Ota (JP); Hiroya Ichikawa, Yokohama (JP); Kazuki Kora, Yokohama (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 658 days.

(21) Appl. No.: 16/402,858

(22) Filed: May 3, 2019

(65) Prior Publication Data

US 2019/0344383 A1    Nov. 14, 2019

(30) Foreign Application Priority Data

May 11, 2018  (JP) .............................. JP2018-091839
Feb. 7, 2019  (JP) .............................. JP2019-020697

(51) Int. Cl.
*B23K 26/064* (2014.01)
*B23K 26/00* (2014.01)
(Continued)

(52) U.S. Cl.
CPC .......... *B23K 26/064* (2015.10); *B23K 26/009* (2013.01); *B23K 26/032* (2013.01); *B23K 26/062* (2015.10)

(58) Field of Classification Search
CPC .... B23K 26/03; B23K 26/032; B23K 26/009; B23K 26/064; B23K 26/0643;
(Continued)

(56) References Cited

U.S. PATENT DOCUMENTS 5,790,620 A    8/1998  Okazaki et al.
6,034,349 A *  3/2000  Ota ....................... B23K 26/082
                                                    219/121.73
(Continued)

FOREIGN PATENT DOCUMENTS

CN    105014235 A    11/2015
CN    106944742 A     7/2017
(Continued)

OTHER PUBLICATIONS

Yuji Sano, et al., "Residual Stress Improvement Mechanism on Metal Material by Underwater Laser Irradiation", vol. 42. No. 6, 2000, 18 pages (with Machine English translation).

(Continued)

*Primary Examiner* — Chris Q Liu
(74) *Attorney, Agent, or Firm* — Oblon, McClelland, Maier & Neustadt, L.L.P.

(57) ABSTRACT

A laser peening device includes: a laser oscillator; an irradiation nozzle for irradiating a laser beam onto an irradiation target; an optical transmission unit; a shutter attached to the optical transmission unit; a liquid feeder for supplying the irradiation nozzle with liquid to cause the liquid to flow along an optical path of the laser beam running from the irradiation nozzle to the irradiation target; an ongoing irradiation sensor for obtaining information on ongoing laser beam irradiation indicating whether the laser beam is being appropriately irradiated for execution of ongoing laser peening operation on the irradiation target; and a control unit controlling the shutter according to the information on the ongoing laser beam irradiation obtained by the ongoing irradiation sensor.

6 Claims, 10 Drawing Sheets

(51) Int. Cl.
*B23K 26/03* (2006.01)
*B23K 26/062* (2014.01)

(58) Field of Classification Search
CPC ............ B23K 26/0665; B23K 26/0096; B23K 26/034; B23K 26/04; B23K 26/042; B23K 26/043; B23K 26/044; B23K 26/06; B23K 26/0604; B23K 26/062; B23K 26/0622; B23K 26/0626; B23K 26/0648; B23K 26/066; B23K 26/067; B23K 26/0673
USPC .............. 219/121.83, 121.68, 121.85, 121.6, 219/121.62, 121.63, 121.64, 121.69, 219/121.7, 121.72, 121.73, 121.75, 121.8
See application file for complete search history.

(56) References Cited

U.S. PATENT DOCUMENTS

| | | | | |
|---|---|---|---|---|
| 2003/0052099 | A1* | 3/2003 | Lipman | B23K 26/042 219/121.68 |
| 2004/0124227 | A1* | 7/2004 | Seki | H04N 5/35518 228/103 |
| 2005/0011867 | A1* | 1/2005 | Okuda | B23K 26/03 219/121.63 |
| 2005/0092724 | A1 | 5/2005 | Warren, Jr. et al. | |
| 2011/0079350 | A1 | 4/2011 | Lee et al. | |
| 2012/0074105 | A1* | 3/2012 | Okamoto | B23K 26/146 219/121.72 |
| 2015/0314394 | A1 | 11/2015 | Mori | |
| 2017/0087667 | A1 | 3/2017 | Yamamoto et al. | |
| 2017/0282298 | A1 | 10/2017 | Nakano | |

FOREIGN PATENT DOCUMENTS

| | | |
|---|---|---|
| CN | 107262931 A | 10/2017 |
| JP | 7-16779 A | 1/1995 |
| JP | 3461948 | 10/2003 |
| JP | 2006-292424 A | 10/2006 |
| JP | 2011-079051 | 4/2011 |
| JP | 4868729 | 2/2012 |
| JP | 4902111 | 3/2012 |
| JP | 6063635 | 1/2017 |
| JP | 2017-119304 | 7/2017 |
| JP | 2017-131907 A | 8/2017 |

OTHER PUBLICATIONS

Minoru Obata et al., "Development of Stress Improvement Technique Using Pulse Laser Irradiation Evaluation of Stress Improvement for Type 304 Stainless Steel", vol. 49. No. 2, (2000), 20 pages (with Machine English translation).

* cited by examiner

LASER PEENING DEVICE AND LASER PEENING METHOD

CROSS-REFERENCE TO RELATED APPLICATION(S)

This application is based upon and claims the benefit of priority from Japanese Patent Applications No. 2018-091839, filed on May 11, 2018 and No. 2019-020697, filed on Feb. 7, 2019, the entire contents of which are incorporated herein by reference.

FIELD

This invention relates to a laser peening device and a laser peening method to be used for the purpose of modifying a material by generating a residual compressive stress by means of irradiation of a laser beam.

BACKGROUND

In nuclear power plants, various maintenance techniques are being executed on the machines disposed inside and outside the nuclear reactors by accessing them by means of automotive vehicles at the time of the periodical inspection. Among others, laser peening techniques have been and being developed as countermeasures against stress corrosion crackings (SCC) attributable to the tensile stress remaining in the welded parts of the nuclear reactors because those techniques can effectively prevent stress corrosion crackings from taking place.

With laser peening, for instance, a laser beam having a pulse width of somewhere between about 5 nsec and about 10 nsec is converged to a spot having a diameter of about 1 mm by means of a condenser lens and irradiated onto the surface to be worked (of the irradiation target). At this time, the surface of the material being irradiated with the laser beam absorbs energy and is turned into a plasma state. When the plasma is covered by liquid that is transparent to the wavelength of the laser beam, the plasma is prevented from expanding and the inside pressure of the plasma rises up to about several GPa to in turn give a shock to the surface to be worked. Then, a strong shock wave is generated and propagated into the inside of the material to give rise to plastic deformation and bring the residual stress into a compressed state.

When laser peening is compared with other peening techniques such as shot peening and water jet peening, the peening effect is scarcely dependent on the material strength and, if the material is provided with a plate-like shape, gets to the inside of the plate-shaped material by about 1 mm from the surface. Additionally, laser peening is free from reaction force at the time of the execution of the peening process and the laser peening device to be used can be made compact to provide an advantage of being capable of operating at narrow sites.

As described above, laser peening is a process of giving plastic deformation to the surface layer of the target by means of plasma pressure and the compression effect as pointed out above can be obtained by irradiating a laser beam having a diameter and energy that are within respective appropriate ranges.

Because of the straight-advancing property of laser beams, if an irradiated laser beam gets out of appropriate ranges in terms of laser beam diameter and energy, the laser beam remains and eventually becomes absorbed by the irradiation target to give rise to thermal effect. Such a situation arises when the irradiated laser beam goes away from the irradiation target without being blocked. In such an instance, the laser beam can be left unremoved at a site separated from the irradiation target after passing through the focal point of the laser beam and the laser beam will be irradiated there.

When the laser beam irradiation spot is sufficiently small, the laser beam irradiation will unnecessarily be repeated to result in useless irradiation but the adverse effect on the irradiated material will relatively be limited. However, if the laser beam irradiation spot becomes large after passing through the focal point, the laser irradiation energy density would extremely fall down. Then, the net result would be that not only the intended peening effect becomes unattainable but also a phenomenon of heat generation and that of oxidation arise due to laser light absorption to give rise to residual tensile stress depending on the conditions of laser beam irradiation.

It is a general practice to arrange a laser beam blocking shutter at the inside or outside of the laser oscillator and the shutter can be closed anytime in order to prevent such harmful irradiation from taking place. However, as boundary surfaces intersect each other and the inclination of the tangential line of either one of the surfaces suddenly becomes discontinuous (to be referred to as discontinuous section hereinafter), the laser peening operation that has hitherto been in a state of being executed within appropriate conditional ranges of laser beam irradiation in terms of laser beam spot diameter, irradiation energy and so on one of the surfaces can suddenly get into a state where the operation goes out of the appropriate conditional ranges once the operation crosses the boundary.

In instances where the target of laser beam irradiation is a continuous plane, the operation of controlling the opening and closing of the shutter is started as soon as the operation of the laser beam irradiation head is terminated. However, in instances where a discontinuous section is involved as described above, it is difficult to satisfactorily block the residual light only by means of the operation of controlling the opening and closing of the shutter that is based on the operation loci that are prepared in advance or the operation loci that are prepared on site because the positional relationship between the laser beam irradiation head and the target of laser beam irradiation can show a slight discrepancy between the estimated environmental conditions and the actual environmental conditions.

Particularly, in view of the fact that a relatively long time is required between a temporary suspension of the operation of a laser oscillator per se and resumption of the operation, when the operation confronts a discontinuous section, it is desirable to quickly suspend the operation of laser beam irradiation while keeping the laser oscillator continuously operating. Additionally if the shutter for blocking the laser beam generated from the laser oscillator is held in a closed state for a long period of time, the shutter would become overheated. Therefore, a countermeasure for such a situation would be required.

BRIEF DESCRIPTION OF DRAWINGS

FIG. 3A illustrates the output of the ongoing irradiation sensor, which is an acoustic sensor.

FIG. 3B illustrates the intensity of the laser beam being irradiated.

FIG. 3C illustrates the shutter control signal.

DETAILED DESCRIPTION

Figure 1:
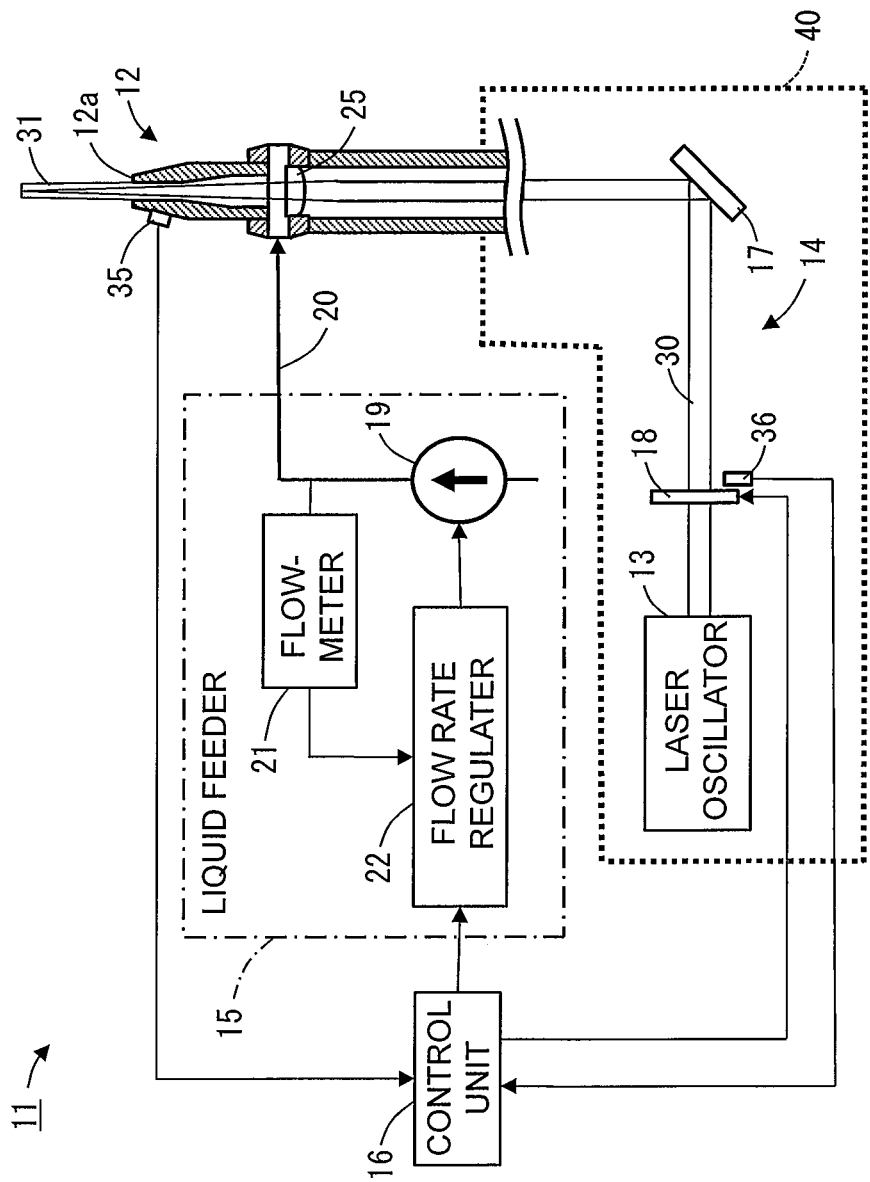
FIG. 1 is a schematic illustration of a first embodiment of a laser peening device according to the present invention, showing the configuration thereof.

The embodiments have been made in view of the above-described problems. An object of the embodiments is to provide a laser peening device and a laser peening method that can suppress harmful laser beam irradiations due to residual laser light if the target of laser beam irradiation involves one or more discontinuous sections.

According to an aspect of the present invention, there is presented a laser peening device comprising: a laser oscillator for generating a laser beam; an irradiation nozzle for irradiating a laser beam onto an irradiation target disposed in a transparent liquid, the liquid allowing the laser beam to pass therethrough, in order to execute a laser peening operation on the irradiation target; an optical transmission unit for transmitting the laser beam generated by the laser oscillator to the irradiation nozzle; a shutter attached to the optical transmission unit so as to be opened and closed to arbitrarily block transmission of the laser beam; a liquid feeder for supplying the irradiation nozzle with liquid so as to cause the liquid to flow along an optical path of the laser beam running from the irradiation nozzle to the irradiation target; an ongoing irradiation sensor for obtaining information on ongoing laser beam irradiation indicating whether the laser beam is being appropriately irradiated for execution of ongoing laser peening operation on the irradiation target; and a control unit for controlling the shutter according to the information on the ongoing laser beam irradiation obtained by the ongoing irradiation sensor.

According to an aspect of the present invention, there is presented a laser peening method comprising: an irradiation step irradiating a laser beam onto an irradiation target disposed in a transparent liquid for a laser peening operation, the transparent liquid forming an optical path for the laser beam to pass therethrough; a liquid feeding step supplying liquid flowing along the optical path of the laser beam and causing the liquid flow toward the irradiation target so as to cover a spot on the irradiation target to be irradiated with the laser beam for the laser peening operation; an information obtaining step obtaining information on the ongoing laser beam irradiation indicating whether the irradiation of the laser beam in the irradiation step is being executed appropriately for the ongoing laser peening operation or not by means of an ongoing irradiation sensor; a determination step determining whether the irradiation of the laser beam in the irradiation step is being executed appropriately for the ongoing laser peening operation on the irradiation target or not on a basis of the information on the ongoing laser beam irradiation while the irradiation step is being executed; and an ongoing irradiation suspending step suspending the ongoing irradiation when it is determined in the determining step that the irradiation of the laser beam is not being executed appropriately for the ongoing laser peening operation on the irradiation target.

Now, a laser peening device and a laser peening method according to embodiments of the present invention will be described below by way of preferred embodiments and by referring to the accompanying drawings. In the drawings, parts that are same with or similar to each other are denoted by the same reference symbols and will not be described repeatedly.

First Embodiment

FIG. 1 is a schematic illustration of a first embodiment of a laser peening device according to the present invention, showing the configuration thereof. The laser peening device 11 comprises an irradiation nozzle 12, a laser oscillator 13, an optical transmission unit 14, a liquid feeder 15 and a control unit (a controller) 16.

The laser oscillator 13 generates a laser beam 30. The generated laser beam 30 is transmitted to the irradiation nozzle 12 by way of the optical transmission unit 14. The optical transmission unit 14 includes a mirror 17 and a shutter 18.

Figure 2:
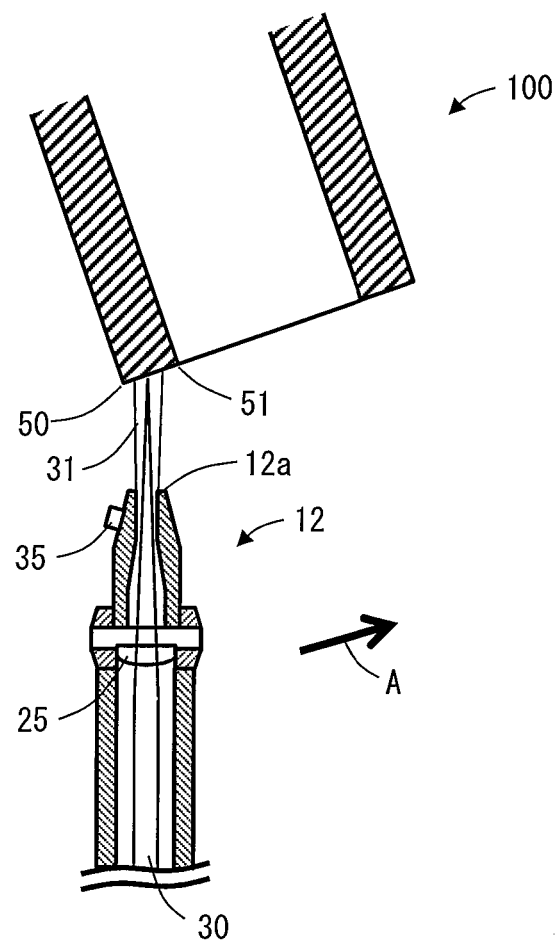
FIG. 2 is an illustration of a positional relationship between the irradiation nozzle and the irradiation target in an instance where the first embodiment of laser peening device is employed with the laser peening method.

The irradiation nozzle 12 has a gas-liquid separating element 25. The gas-liquid separating element 25 partitions the inside of the irradiation nozzle 12 into a gas-containing section and a liquid-containing section. The laser beam 30 transmitted from the optical transmission unit 14 passes through gas until it gets to the gas-liquid separating element 25. After the laser beam 30 passes through the gas-liquid separating element 25, it passes through transparent liquid and travels from the front end 12a of the irradiation nozzle 12 toward the irradiation target 100 (FIG. 2).

The liquid feeder 15 feeds transparent liquid such as water that allows a laser beam to pass through to the liquid-containing section of the irradiation nozzle 12. The liquid feeder 15 includes a liquid feed pump 19, a liquid feed pipe 20, a flowmeter 21 and a flow rate regulator 22. The liquid that is pressurized by the liquid feed pump 19 is then fed to the irradiation nozzle 12 by way of the liquid feed pipe 20. The flow meter 21 is attached to the liquid feed pipe 20. The flow rate regulator 22 regulates the flow rate of the liquid that is being fed to the irradiation nozzle 12 so as to hold it within a predetermined range on the basis of the flow rate detected by the flowmeter 21. The flow rate may typically be regulated by adjusting the rotational speed of the liquid feed pump 19. Alternatively, a flow regulating valve (not shown) may be arranged at the liquid feed pipe 20 to regulate the flow rate.

In the instance illustrated in FIG. 1, the liquid that is supplied from the liquid feed pipe 20 into the irradiation nozzle 12 is so driven as to be directed to the beam path through which the laser beam 30 passes from the mutually opposite sides of the beam path in directions perpendicular to the direction in which the laser beam 30 passes through the inside of the irradiation nozzle 12. The liquid that is fed into the inside of the irradiation nozzle 12 is ejected from the front end 12a of the irradiation nozzle 12 toward the irradiation target 100 (FIG. 2) along the direction in which the laser beam 30 proceeds so as to form one or more jet flows 31 of liquid that is coaxial with the laser beam 30. Liquid may be supplied from the liquid feed pipe 20 into the inside of the irradiation nozzle 12 so as to get to a pair of oppositely disposed spots as shown in FIG. 1. Alternatively, it may be supplied to a single spot or three or more spots.

In the instance illustrated in FIG. 1, the liquid feed pipe 20 is attached to the irradiation nozzle 12 in a direction perpendicular to the axial direction of the irradiation nozzle 12 (and hence perpendicular to the traveling direction of the laser beam 30 and that of the jet flow 31 coming out from the front end 12a of the irradiation nozzle 12) so as to direct the liquid being supplied from the liquid feed pipe 20 into the inside of the irradiation nozzle 12 in a direction perpendicular to the traveling direction of the laser beam 30 in the irradiation nozzle 12. However, the arrangement of the liquid feed pipe 20 is not limited to the above-described one. Alternatively, the liquid feed pipe 20 may be attached to the irradiation nozzle 12 in a direction that is inclined relative to the axial direction of the irradiation nozzle 12 so that the flow of the liquid being supplied from the liquid feed pipe 20 into the inside of the irradiation nozzle 12 shows an oblique angle relative to the traveling direction of the laser beam 30 in the inside of the irradiation nozzle 12.

Note that the liquid to be supplied from the liquid feed pipe 20 into the inside of the irradiation nozzle 12 is preferably supplied so as not to show any velocity for the swirling component (that is a circumferential component) relative to the traveling direction (or the axial direction) of the laser beam 30 in the inside of the irradiation nozzle 12, while the liquid that is driven to flow from the liquid feed pipe 20 into the inside of the irradiation nozzle 12 is preferably made to flow in radially (in radially inward direction) relative to the traveling direction of the laser beam 30 that is located at the center when viewed in the traveling direction of the laser beam 30 (the axial direction of the irradiation nozzle 12).

The laser beam 30 that is transmitted to the irradiation nozzle 12 by way of the optical transmission unit 14 is then made to pass through the jet flow 31 and irradiated from the front end 12a of the irradiation nozzle 12 toward the irradiation target 100. The laser beam directed to the irradiation target 100 is focused on the surface of the irradiation target 100.

Thus, the laser beam 30 passes through the jet flow 31 and liquid is supplied to the irradiation target 100 by the jet flow 31. Therefore, an operation of laser beam irradiation can properly be executed even if the irradiation target 100 is held in air. Additionally, an operation of laser beam irradiation can be executed in a similar way even if the irradiation target 100 is dipped in liquid. Differently stated, the jet flow 31 of liquid reliably covers the spot on the irradiation target 100 where the current operation of laser beam irradiation is being executed and, at the same time, liquid is ejected (supplied) to the irradiation target along the optical axis of or otherwise coaxially with the laser beam 30 so as to form a jet flow 31 of liquid there.

An ongoing irradiation sensor 35 is attached to the irradiation nozzle 12 at a position close to the front end 12a thereof. The ongoing irradiation sensor 35 is provided to obtain information on the ongoing laser beam irradiation that is being executed (an ongoing irradiation indicating signal) indicating whether a jet flow 31 of liquid is actually being ejected toward the irradiation target 100 or not and whether a laser beam 3 is actually being irradiated onto the irradiation target 100 and hence laser beam irradiation is going on in a proper manner or not. The ongoing irradiation sensor 35 may typically be an acoustic sensor for detecting the sound generated at the site of laser beam irradiation (or at the laser beam irradiation spot). The output signal of the ongoing irradiation sensor 35 is sent to the control unit 16.

When an acoustic sensor is adopted for the ongoing irradiation sensor 35 as in this embodiment, it is less directional if compared with a light sensor so that it provides a greater tolerance to the conditions for sensor installation.

The shutter 18 can block the laser beam emitted from the laser oscillator 13 before it gets to the irradiation nozzle 12. It can be opened and closed. The shutter 18 may have a structure adapted to reflect the laser beam 30 toward a damper (not shown) or a structure adapted to absorb the energy of the laser beam 30 by itself.

A shutter temperature sensor 36 for detecting the temperature of the shutter 18 is arranged near the shutter 18. The output signal of the shutter temperature sensor 36 is sent to the control unit 16.

The control unit 16 receives the output signal of the ongoing irradiation sensor 35 and that of the shutter temperature sensor 36, and controls the flow rate regulator 22 and the shutter 18 according to the respective output signals. The control operations of the control unit 16 will be described in greater detail later by referring to FIG. 4.

In the arrangement illustrated in FIG. 1, the irradiation nozzle 12, the laser oscillator 13, the optical transmission unit 14 and the shutter 18 are attached to a drive unit 40. The relative positional relationship between the above-listed component members including the irradiation nozzle 12 and the irradiation target 100 can be changed by means of the drive unit 40. Alternatively, if an optical fiber cable (not shown) is adopted for the optical transmission unit 14, the positional relationship between the irradiation nozzle 12 and the laser oscillator 13 can flexibly be changed. Then, only the irradiation nozzle 12 can be made movable, while the laser oscillator 13 and the remaining other component members may be made stationary.

FIG. 2 is an illustration of a positional relationship between the irradiation nozzle 12 and the irradiation target 100 in an instance where the first embodiment of laser peening device 11 is employed with the laser peening method. The irradiation target 100 has, for example, a cylindrical tubular shape and a jet flow 31 of liquid is ejected from the irradiation nozzle 12 toward an open end of the cylindrical irradiation target 100, while a laser beam 30 that passes through the liquid jet flow is irradiated onto the irradiation target 100. The irradiation target 100 is stationarily secured in position and the irradiation nozzle 12 is moved in the direction of arrow "A" shown in FIG. 2 during the execution of the operation of laser beam irradiation of the laser peening device 11. Between the first irradiation point 50 and the second irradiation point 51, where the point 51 is a discontinuity point, as shown in FIG. 2, all the points of irradiation of the laser beam 30 (points of execution of the operation of laser beam irradiation) are located at respective intended positions on the irradiation target 100 and the operation of laser beam irradiation is executed under intended conditions.

As the irradiation nozzle 12 is moved further from the second irradiation point 51 in the direction of arrow A, the point of laser beam irradiation is abruptly moved from the end of the cylindrical irradiation target 100 into the inside of the cylindrical irradiation target 100 so that thereafter the laser beam 30 is irradiated onto positions that are out of focus of the laser beam 30. Then, the laser beam 10 is irradiated over an extremely large area. Therefore, if irradiation of the laser beam 30 is continued, the laser beam 30 is irradiated onto the inner surface of the irradiation target 100 under conditions that are deviated from the intended laser peening conditions, and residual tensile stress can arise in the area that is irradiated with the laser beam under the conditions deviated from the intended laser peening conditions. Additionally, the residual compressive stress produced in a preceding laser peening operation can be reduced. Such a situation would be against the objective of producing residual compressive stress by means of a laser peening operation and hence undesirable.

Such undesirable irradiation of thea laser beam can be avoided by means of this embodiment of the present invention. More specifically, the current situation of the ongoing operation of irradiation of a laser beam is monitored by the ongoing irradiation sensor 35 and, when the above-described situation that the laser beam irradiation has passed through the second irradiation point 51, which is a discontinuity point, is detected, the operation of laser beam irradiation is immediately suspended.

Figure 3A:
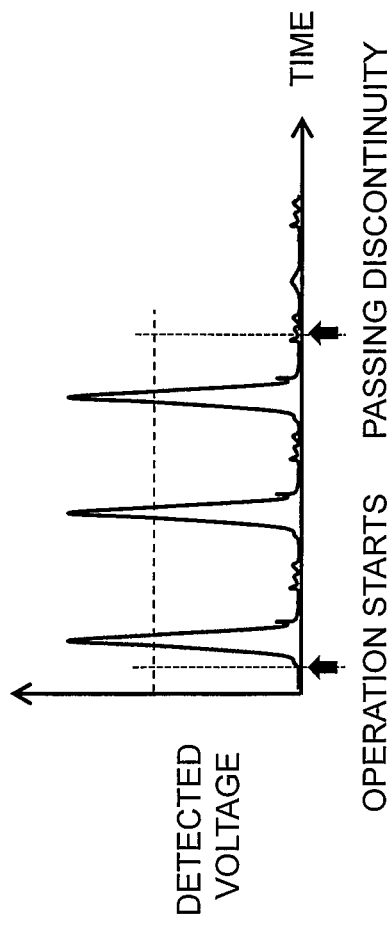
FIGS. 3A, 3B and 3C are timing charts, illustrating the change with time of the status of the operation of laser beam irradiation that is being executed for laser peening by using the first embodiment of laser peening device.
Figure 3B:
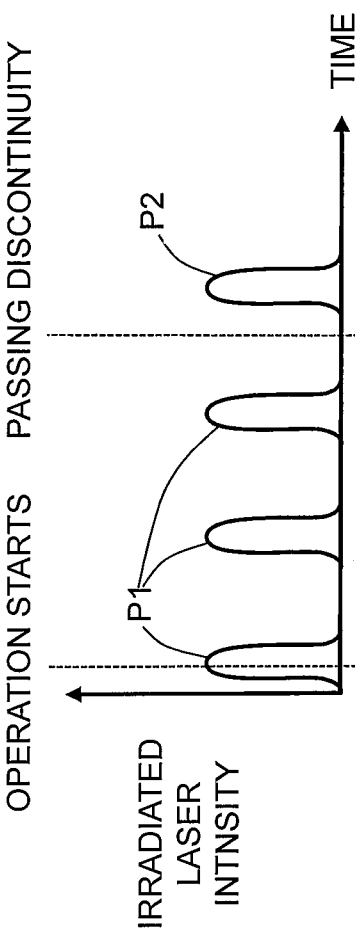
Figure 3C:
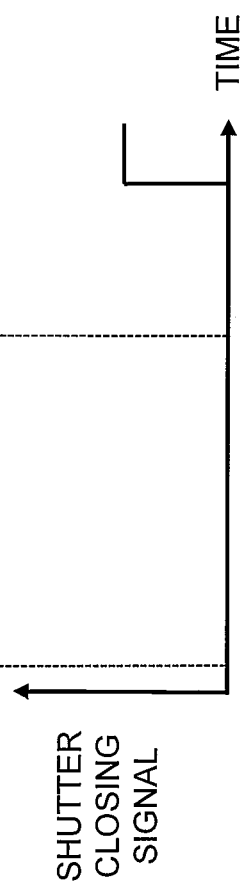

FIGS. 3A, 3B and 3C are timing charts, illustrating the change with time of the status of the operation of laser beam irradiation that is being executed for laser peening by using this embodiment of laser peening device 11. FIG. 3A illustrates the output of the ongoing irradiation sensor, which is an acoustic sensor, and FIG. 3B illustrates the intensity of the laser beam being irradiated, while FIG. 3C illustrates the shutter closing control signal. Note that the irradiation nozzle 12 is moved in the direction of arrow A as shown in FIG. 2 and the point of laser beam irradiation is shifted from the first irradiation point (irradiation starting point) 50 to the second irradiation point (discontinuity point) 51 and, after passing through the second irradiation point 51, further in the direction of arrow A.

As shown in FIGS. 3A, 3B and 3C, a normal laser peening operation is executed from the time when the irradiation point leaves the operation starting point to the time immediately before the irradiation point passes through the discontinuity point so that an acoustic signal showing a normal execution of the laser peening operation that corresponds to pulses P1 of the irradiated laser beam will be detected. However, once the irradiation point passes through the discontinuity point, the irradiated laser beam goes out of the appropriate operating conditions. Therefore, if pulse P2 of the laser beam is irradiated, an acoustic signal that shows a voltage level remarkably lower than the ordinary acoustic signal will be detected. Therefore, the fact that the irradiation point has passed through the discontinuity point can be detected by seeing the output of the ongoing irradiation sensor 35 that includes an acoustic sensor. Then, the control unit 16 finds out on the basis of the acoustic signal that laser beam irradiation that does not satisfy the laser peening conditions is going on. Thus, the control unit 16 transmits a control signal for closing the shutter 18 (FIG. 3C). The abrupt fall of the level of the acoustic signal can be detected by referring to a predetermined threshold level, for example.

Figure 4:
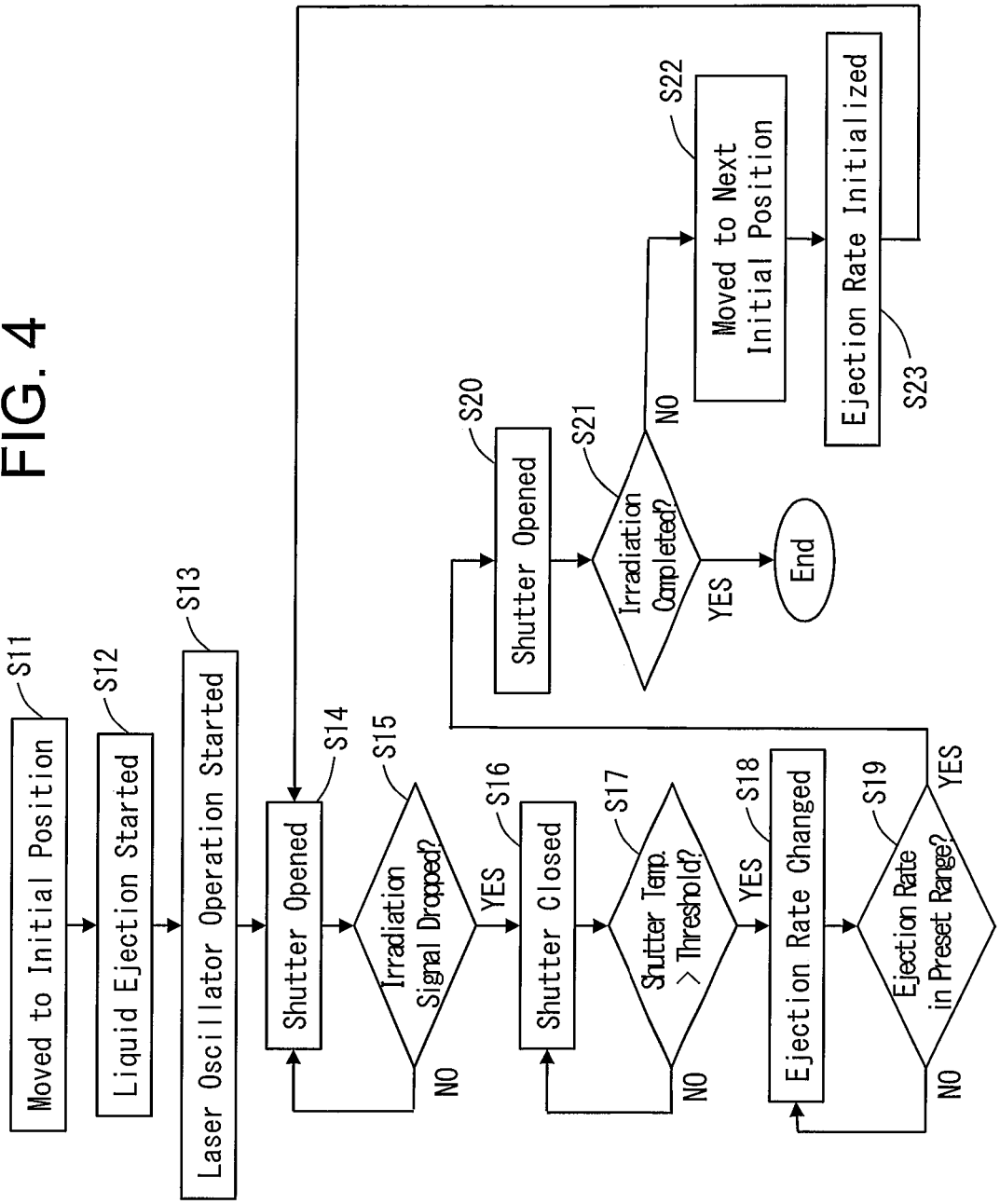
FIG. 4 is a flowchart illustrating a procedure to be taken by the laser peening method when the first embodiment of laser peening device is employed.

FIG. 4 is a flowchart illustrating a procedure to be taken by the laser peening method when the first embodiment of laser peening device is employed. Now, the laser peening method will be described in detail below, by referring to FIG. 4.

To begin with, the irradiation nozzle 12 is put to its initial position by means of the drive unit 40 (Step S11). Next, an operation of ejecting a jet flow of the liquid from the irradiation nozzle 12 is started by the liquid feeder 15 (Step S12). Then, an operation of the laser oscillator 13 is started with shutter 18 held in a closed state (Step S13).

Thereafter, the shutter 18 is opened to start an operation of laser beam irradiation (Step S14). Subsequently, the output signal of the ongoing irradiation sensor 35 is continuously monitored to determine whether the level of the output signal of the ongoing irradiation sensor 35 has abruptly fallen or not (Step S15). If YES is obtained in this determination step S15, then it is determined that the point of laser beam irradiation has passed through a discontinuity point and the shutter 18 is closed (Step S16). As a result, the operation of irradiating the surface of the irradiation target 100 with a laser beam 30 is suspended to automatically prevent harmful irradiation of a laser beam from taking place.

Thereafter, the output of the shutter temperature sensor 38 is continuously monitored and, when the temperature of the shutter 18 exceeds a predetermined threshold value (if YES is obtained in Step S17), the flow rate regulator 22 changes the flow rate of the liquid jet flow according to a command issued from the control unit 16 to change the preset flow rate of the liquid jet flow (Step S18). More specifically, the flow rate regulator 22 changes the preset flow rate to a value higher than a first preset threshold flow rate that is remarkably higher than the normal flow rate or to a value lower than a second preset threshold flow rate that is remarkably lower than the normal flow rate.

Differently stated, the first preset threshold flow rate that is much higher than the normal flow rate range or the second preset threshold flow rate that is much lower than the normal flow rate range is provided in advance to produce a situation where no laser beam is to be transmitted and the flow rate of the liquid jet flow is controlled so as to be higher than the first preset threshold flow rate or lower than the second preset threshold flow rate.

When the flow rate of the jet flow of the liquid that is being supplied from the liquid feeder 15 becomes remarkably high, the jet flow 31 turns to be unstable and conceivably draws in the surrounding gas. Then, the drawn-in gas operates as inhibitor fluid that obstructs the laser beam 30 that is being transmitted through the liquid. On the other hand, when the flow rate of the liquid jet flow that is being supplied from the liquid feeder 15 becomes remarkably low, the jet flow 31 also turns to be unstable to consequently give rise to an inhibitor fluid that obstructs the laser beam 30 that is being transmitted through the liquid. Then, in either instance, there arises an inhibitor fluid that obstructs the transmission of the laser beam 30 through the liquid jet flow and the inhibitor fluid intervenes in the optical path of the laser beam 30. Thus, when the shutter 18 is opened, the laser beam 30 will be unable to get to the irradiation target 100.

When the flow rate of the liquid jet flow goes out of the preset range so as to give rise to an inhibitor fluid (YES in Step S19), the shutter 18 is opened according to the command issued from the control unit 16 (Step S20). The shutter 18 is prevented from being overheated as the shutter 18 is opened. At this time, a laser beam is emitted from the front end 12a of the irradiation nozzle 12. However, since the flow rate of the liquid jet flow has got into the preset range to give rise to an inhibitor fluid, the laser beam emitted from the front end 12a of the irradiation nozzle 12 is obstructed by the inhibitor fluid on the optical path of the laser beam and hence cannot get to the irradiation target 100. Then, as a result, the ongoing irradiation of the laser beam 30 onto the surface of the irradiation target 100 is suspended to prevent harmful laser beam from being irradiated onto the surface of the irradiation target 100.

Then, if the execution of the operation of laser beam irradiation is not completed (NO in Step S21), the irradiation nozzle 12 is moved back to the initial position for the next operation of laser beam irradiation (Step S22). Thereafter, the flow rate of the liquid jet flow is initialized (Step S23). Then, the operation returns to Step S14 for opening the shutter 18.

In the above description, the shutter 18 is opened after YES is obtained in Step S19 and hence after the flow rate of the liquid jet flow gets back into the preset range in the above-described sequence. However, practically no problem would arise if the shutter 18 is opened before it is confirmed that the flow rate of the liquid jet flow gets back into the present range provided that the flow rate of the liquid jet flow would get back into the preset range within a short period of time.

In the above description, the flow rate regulator 22 constitutes a part of the liquid feeder 15. However, the configuration of the laser peening device may be alternatively so modified as to make the flow rate regulator 22 to be functionally included in the control unit 16.

Furthermore, in the above description, the control unit 16 executes the first suspension of the operation of laser beam irradiation and subsequently, when the shutter 28 is opened, executes the second suspension of the operation of the laser beam irradiation to make the inhibitor fluid intervene in the optical path of the laser beam 30 if the control unit 16 determines that an operation of appropriate laser beam irradiation is not being executed on the basis of the output signal of the ongoing irradiation sensor 35. Alternatively, it may be so arranged that the first suspension of the operation of laser beam irradiation by means of the shutter 18 and the second suspension of the operation of laser beam irradiation by means of the shutter 18 that involves the intervention of the inhibitor fluid may be executed simultaneously. Furthermore, the second suspension of the operation of laser beam irradiation by means of the shutter 18 that involves the intervention of the inhibitor fluid may be executed prior to the execution of the first suspension of the operation of laser beam irradiation by means of the shutter 18.

Particularly, if the first suspension of the operation of laser beam irradiation by means of the shutter 18 and the second suspension of the operation of laser beam irradiation by means of the shutter 18 that involves the intervention of the inhibitor fluid are executed simultaneously and the temperature of the shutter 18 rises above the preset threshold value after the closure of the shutter 18 and before the opening of the shutter 18, the second suspension of the operation of laser beam irradiation that involves the intervention of the inhibitor fluid has already been in place so that the ongoing irradiation of the laser beam 30 onto the surface of the irradiation target 100 can be more reliably suspended.

As described above, with the first embodiment, if the irradiation target includes a discontinuity point, it is possible to effectively suppress harmful laser beam irradiation attributable to a residual laser beam and prevent the shutter from being overheated.

Second Embodiment

Figure 5:
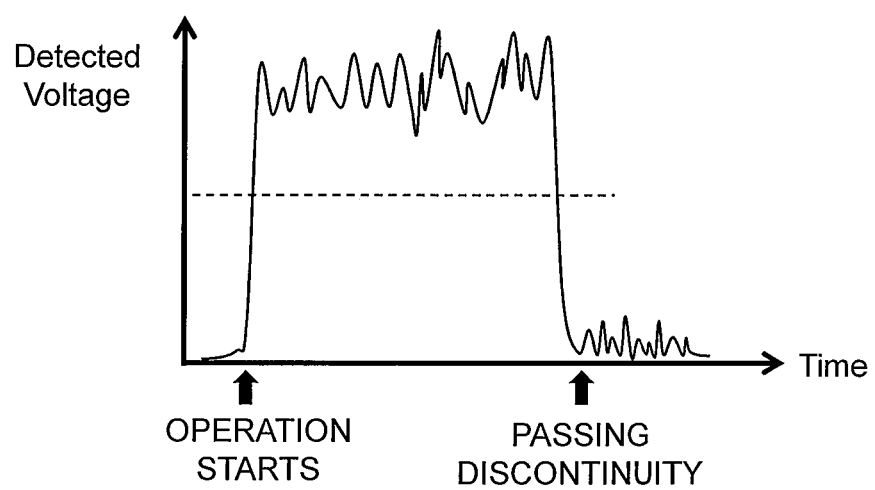
FIG. 5 is a timing chart, illustrating the change with time of the output of the ongoing irradiation sensor, which is an optical sensor, in the operation of laser beam irradiation that is being executed for laser peening by using a second embodiment of a laser peening device according to the present invention.

FIG. 5 is a timing chart, illustrating the change with time of the output of the ongoing irradiation sensor, which is an optical sensor, in the operation of laser beam irradiation that is being executed for laser peening by using a second embodiment of a laser peening device 11 according to the present invention.

The second embodiment is obtained by modifying the first embodiment. While an acoustic sensor is employed for the ongoing irradiation sensor 35 in the first embodiment, an optical sensor is employed for the ongoing irradiation sensor 35 in the second embodiment. Otherwise, the second embodiment is same with the first embodiment.

Just like the first embodiment, when the ongoing operation of laser beam irradiation is in a state as shown in FIG. 2, the irradiation nozzle 12 is moved in the direction of arrow A and the irradiation point is moved from the first irradiation point (irradiation starting point) 50 to the second irradiation point (discontinuity point) 51 and, after passing through the second irradiation point 51, further moved in the direction of arrow A.

In the instance of this second embodiment, a normal operation of laser beam irradiation is executed from the time when the irradiation point starts from the irradiation starting point to the time immediately before the irradiation point passes through the discontinuity point and an optical signal whose signal level indicates that the operation of laser beam irradiation is being normally executed is detected by the optical sensor. However, once the irradiation point passes through the discontinuity point, the normal operation of laser beam irradiation is no longer in place and an optical signal whose signal level is remarkably lower than the signal level indicating that the operation of laser beam irradiation is being normally executed is detected. Therefore, the fact that the irradiation point has passed through the discontinuity point can be detected by seeing the output of the ongoing irradiation sensor 35 in which an optical sensor is adopted.

Thus, just like the first embodiment, with the second embodiment, if the irradiation target includes a discontinuity point, it is possible to effectively suppress harmful laser beam irradiation attributable to a residual laser beam and prevent the shutter from being overheated.

When an optical sensor is adopted for the ongoing irradiation sensor 35 as in this embodiment, information on the ongoing laser beam irradiation can be observed very quickly (because the optical sensor involves the use of speed of light), this embodiment provides an advantage of minimizing the period of time from the time when the irradiation point passes through the discontinuity point to the time when the shutter 18 is closed.

Third Embodiment

Figure 6:
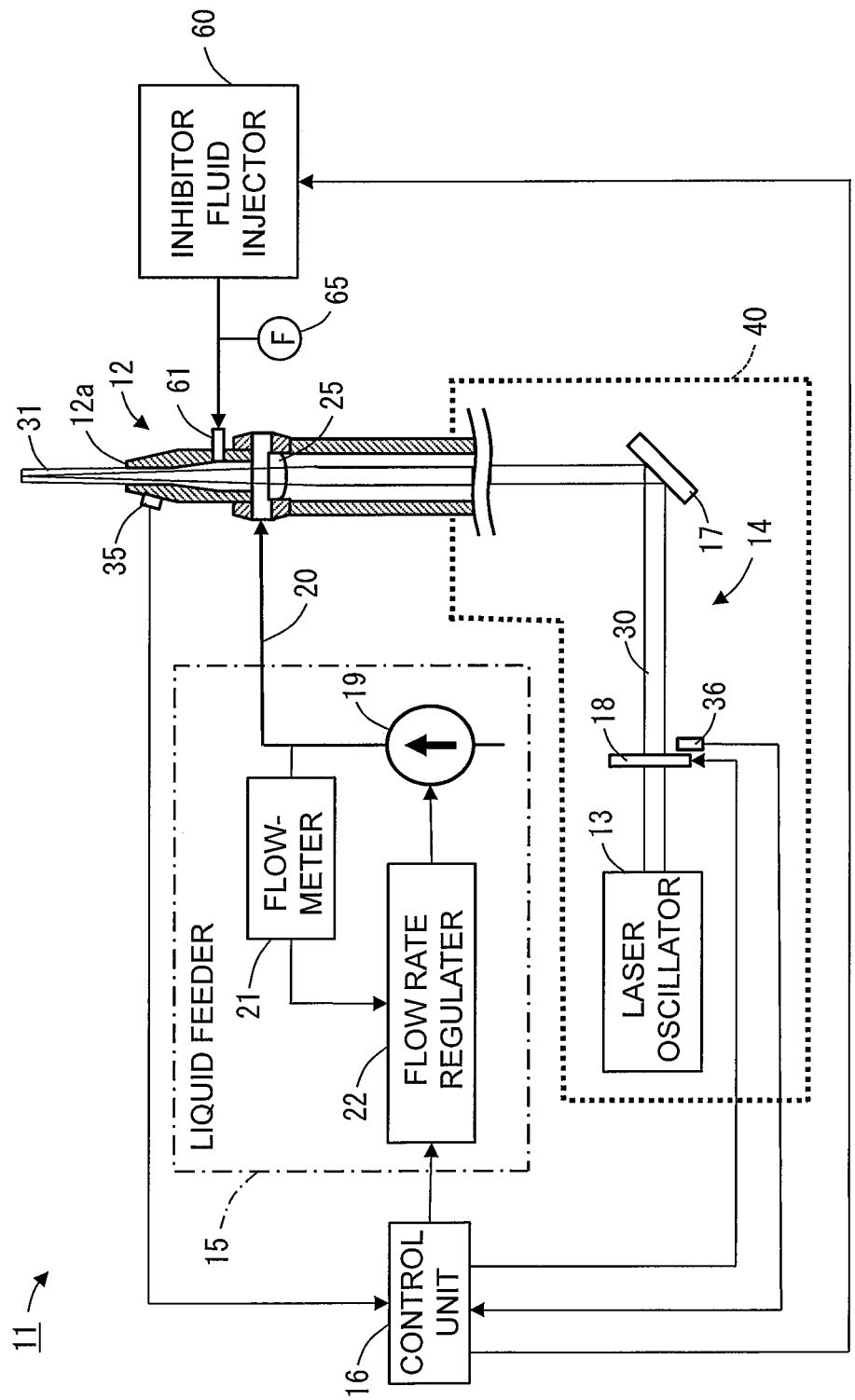
FIG. 6 is a schematic illustration of a third embodiment of a laser peening device according to the present invention, showing the configuration thereof.

FIG. 6 is a schematic illustration of a third embodiment of a laser peening device according to the present invention, showing the configuration thereof. The third embodiment is obtained by modifying the first or second embodiment. The laser peening device 11 of this embodiment comprises an inhibitor fluid injector 60 for injecting a fluid inhibitor for obstructing the transmission of a laser beam through liquid into the irradiation nozzle 12, and an inhibitor fluid measuring instrument 65 for measuring the flow rate of inhibitor fluid injected into the irradiation nozzle 12. The inhibitor fluid may be gas such as air, for example.

As pointed out earlier, the gas-liquid separating element 25 partitions the inside of the irradiation nozzle 12 into a liquid-containing section and a gas-containing section, and an inhibitor fluid injecting section 61 is arranged in the liquid-containing section. The inhibitor fluid supplied from the inhibitor fluid injector 60 is injected into the liquid-containing section of the irradiation nozzle 12 by way of the inhibitor fluid injecting section 61. The flow rate and the timing of injection of inhibitor fluid from the inhibitor fluid injector 60 are controlled by the control unit 16. As inhibitor fluid is injected into the liquid-containing section of the irradiation nozzle 12, the laser beam that is being emitted from the irradiation nozzle 12 is blocked.

Otherwise, the configuration of the third embodiment is the same as that of the first embodiment. With this third embodiment, when the point of laser beam irradiation passes through the discontinuity point during the ongoing irradiation, inhibitor fluid is injected by way of the inhibitor fluid injecting section 61 so that the laser beam emitted from the irradiation nozzle 12 is blocked. While the flow rate regulator 22 of the first embodiment changes the liquid flow rate at this time, it is not necessary for this embodiment to change the liquid flow rate at this time. Note, however, that in an instance where injection of inhibitor fluid is executed independently from the supply of liquid from the liquid feed pipe 20 as shown in FIG. 6, it may be so arranged that the flow rate of liquid supplied from the liquid feed pipe 20 is reduced or the supply of liquid from the liquid feed pipe 20 is suspended in response to the start of injection of inhibitor fluid in order to prevent the total flow rate of fluid supplied into the inside of the irradiation nozzle 12 from becoming excessively large.

Figure 7:
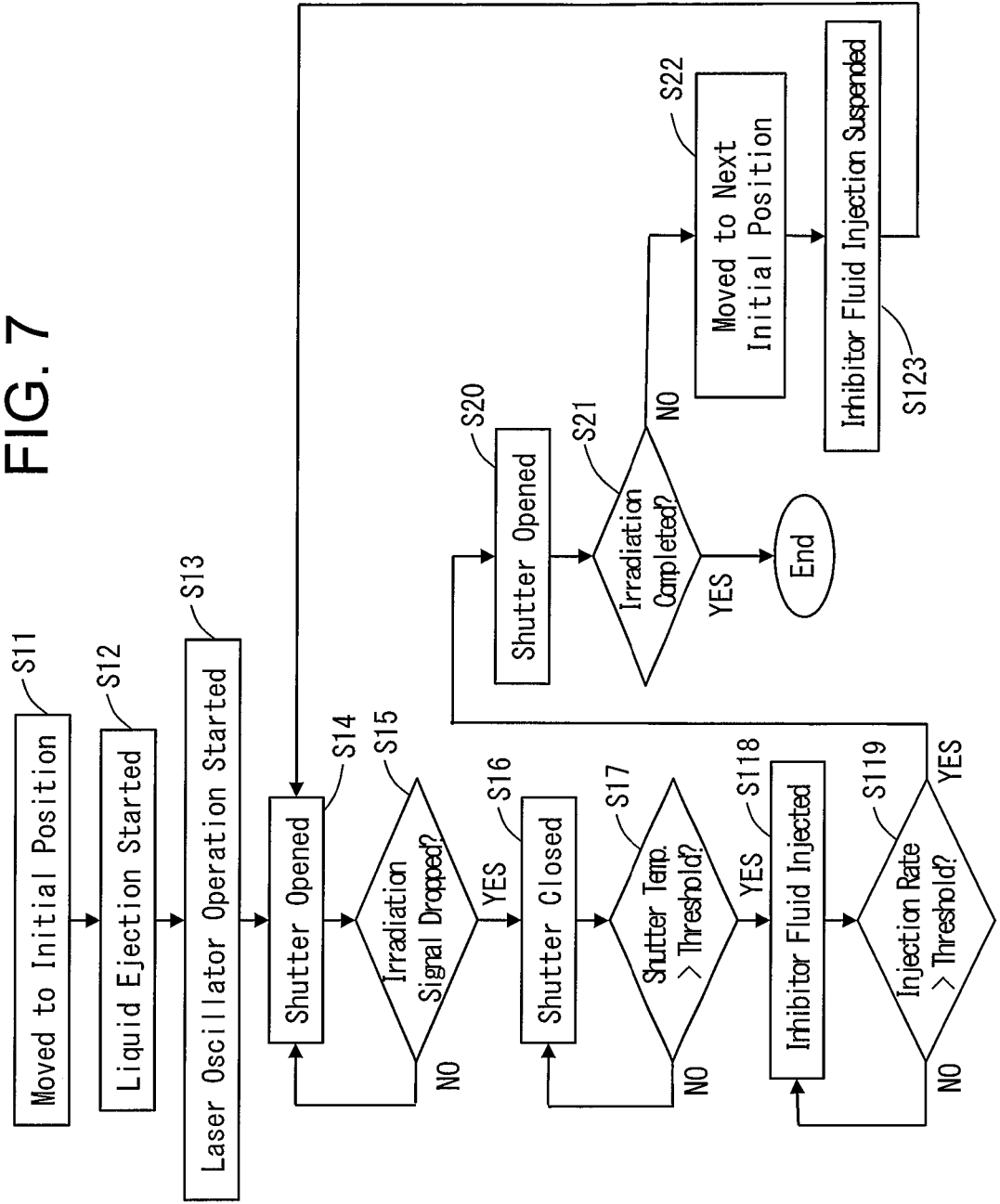
FIG. 7 is a flowchart illustrating a procedure to be taken by the laser peening method when the third embodiment of laser peening device is employed.

FIG. 7 is a flowchart illustrating a procedure to be taken by the laser peening method when the third embodiment of laser peening device is employed. When this flowchart of the third embodiment is compared with the flowchart of the first embodiment (FIG. 4), it will be seen that the former flowchart differs from the latter one in terms of the following steps. Namely, Step S18 of the flowchart of the first embodiment where the flow rate of the liquid jet flow is changed is replaced by Step S118 of the flowchart of the third embodiment where inhibitor fluid is injected. Additionally, Step S19 of the flowchart of the first embodiment where it is determined whether the flow rate of the liquid jet flow is found within the preset range or not is replaced by Step S119 of the flowchart of the third embodiment where it is determined whether the flow rate of the inhibitor fluid exceeds the preset threshold value or not. Still additionally, Step S23 of the flowchart of the first embodiment where the flow rate of inhibitor fluid is initialized is replaced by Step S123 where the injection of inhibitor fluid is suspended. As described earlier, in an instance where the flow rate of liquid supplied from the liquid feed pipe 20 has been changed, the flow rate of liquid to be supplied is initialized (not shown). All the remaining steps of the flowchart of the third embodiment are the same as those of the flowchart of the first embodiment.

With the third embodiment, when the point of laser beam irradiation passes through a discontinuity point during the ongoing irradiation, inhibitor fluid is injected to obstruct the irradiation of the laser beam being emitted from the irradiation nozzle 12. Then, as a result, harmful laser beam irradiation by the residual laser beam is suppressed and the shutter is prevented from being overheated even when the irradiation target includes a discontinuity point.

The third embodiment can advantageously be applied to instances where the irradiation target 100 is entirely immersed in liquid. Note, however, that it is applicable to instances where the irradiation target 100 as a whole is disposed in gas.

While inhibitor fluid that is to be used for the purpose of the present embodiment may be gas such as air in the above description, it may alternatively be liquid provided that the refractive index of the liquid selected as inhibitor fluid differs from the refractive index of the liquid through which the laser beam is driven to pass during a normal operation of laser beam irradiation. Additionally, the inhibitor fluid may be opaque fluid that obstructs the passage of a laser beam. Furthermore, the inhibitor fluid injector 60 may be connected to an intermediary part of the liquid feed pipe 20 by way of a check valve (not shown) so as to cause the injected inhibitor fluid to be mixed with the liquid being supplied through the liquid feed pipe 20.

Fourth Embodiment

Figure 8:
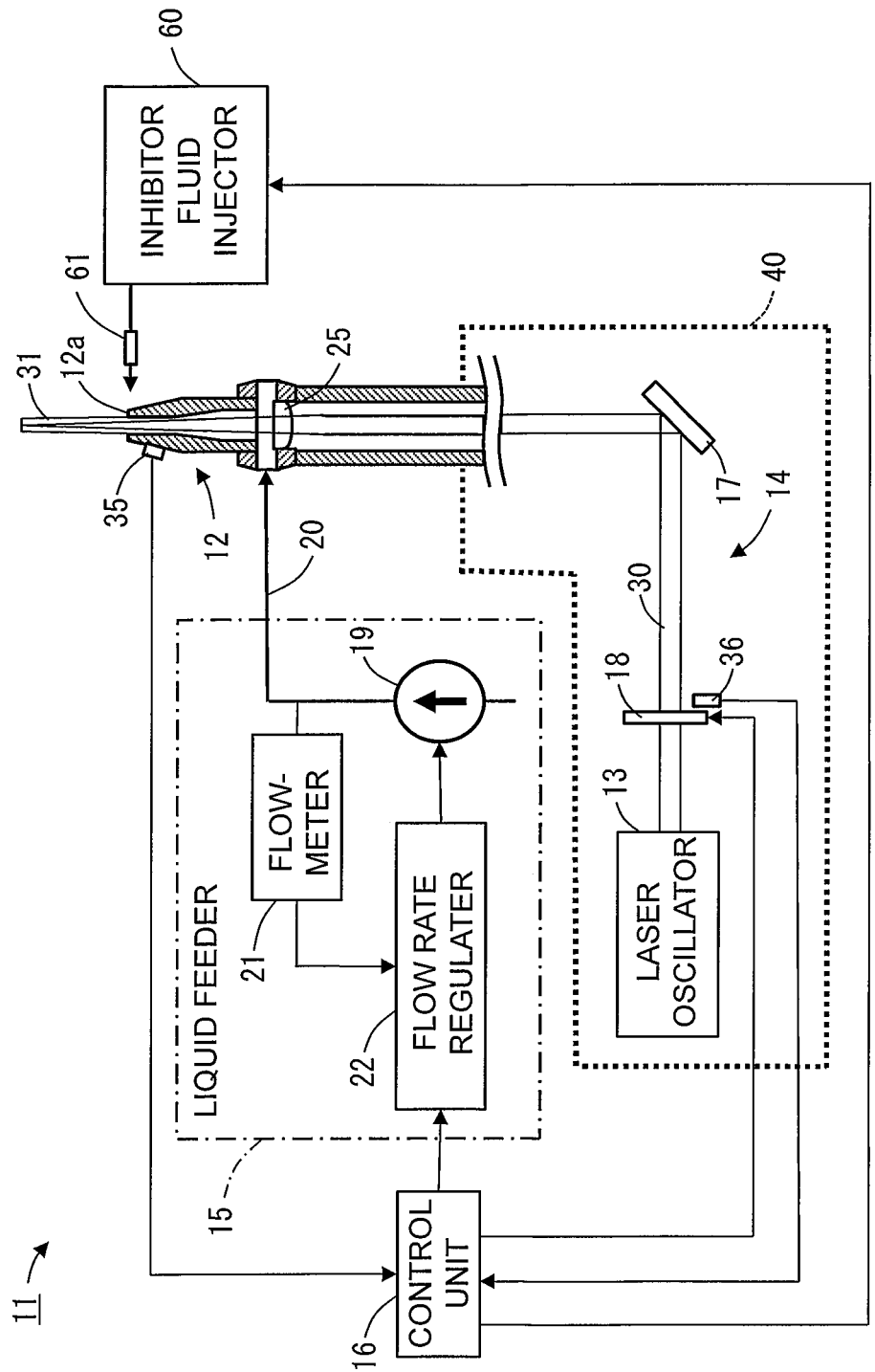
FIG. 8 is a schematic illustration of a fourth embodiment of laser peening device according to the present invention, showing the configuration thereof.

FIG. 8 is a schematic illustration of a fourth embodiment of laser peening device according to the present invention, showing the configuration thereof. The fourth embodiment is obtained by modifying the third embodiment such that the inhibitor fluid injecting section 61 of this embodiment is arranged not in the irradiation nozzle 12 but near the front end 12 of the irradiation nozzle 12 at a position separated from the irradiation nozzle 12. Otherwise, the configuration of the fourth embodiment is the same as that of the third embodiment.

With the fourth embodiment, as inhibitor fluid is injected, the injected inhibitor fluid is mixed with the liquid of the jet flow 31 ejected from the front end 12a of the irradiation nozzle 12 to obstruct the passage of the laser beam through it. Then, as a result, harmful laser beam irradiation by the residual laser beam is suppressed and the shutter is prevented from being overheated even when the irradiation target includes a discontinuity point as described above for the third embodiment.

Fifth Embodiment

Figure 9:
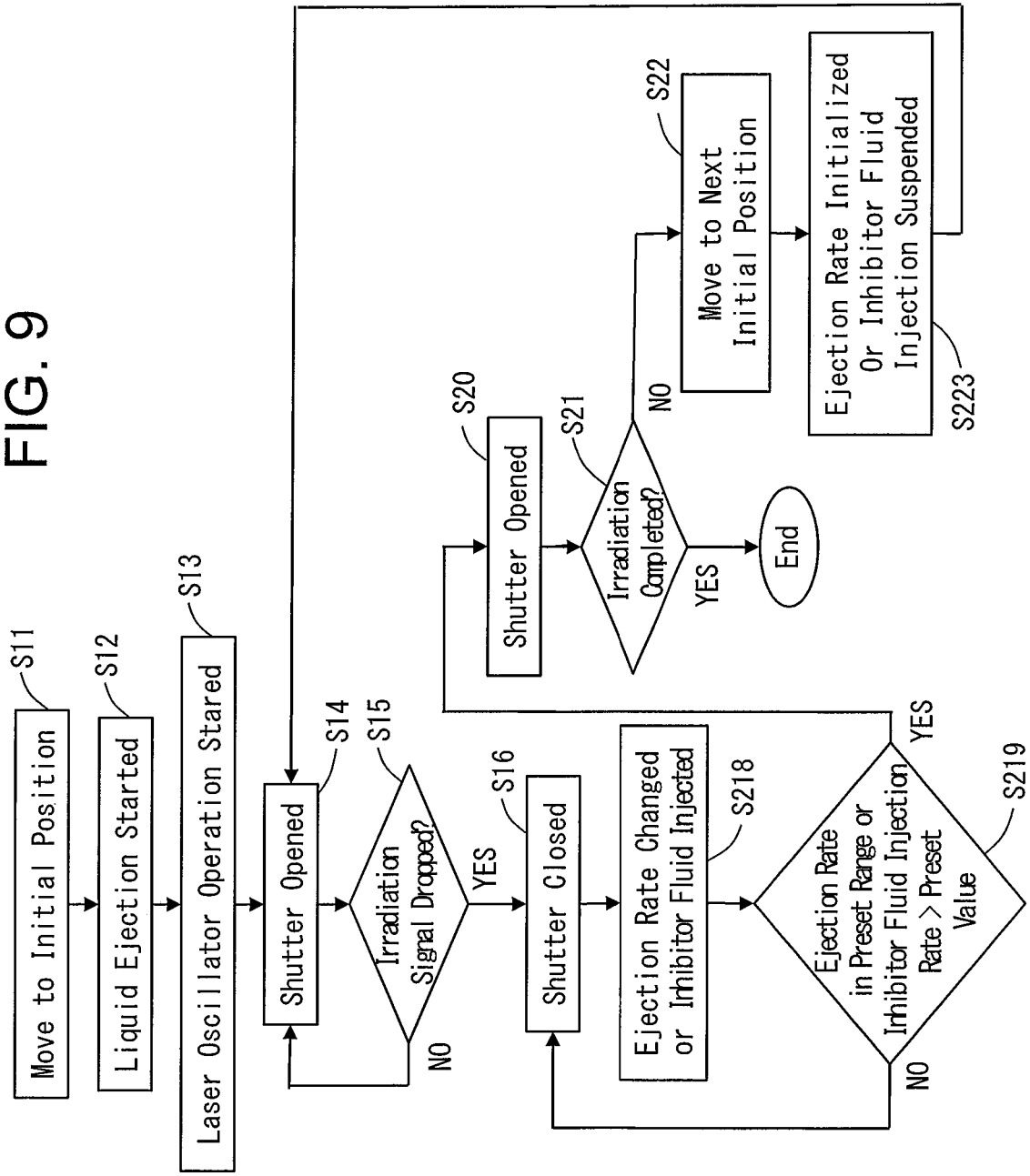
FIG. 9 is a schematic illustration of a fifth embodiment of a laser peening device according to the present invention, showing the configuration thereof.

FIG. 9 is a schematic illustration of a fifth embodiment of a laser peening device according to the present invention, showing the configuration thereof. This fifth embodiment is obtained by modifying the first, third or fourth embodiments such that the operation of controlling the flow rate of the liquid jet flow and the operation of injecting inhibitor fluid are executed without using the shutter temperature sensor 36.

With the fifth embodiment, when the ongoing irradiation signal shows an abrupt fall of the signal level and the shutter is closed (Step S16), the flow rate of the liquid jet flow is changed or injection of inhibitor fluid is started accordingly (Step S218).

Subsequently, it is determined whether the laser peening device is in a state where the irradiation of the laser beam can be obstructed either by the liquid jet flow or by inhibitor fluid, or is not in such a state. In other words, it is determined whether the flow rate of the liquid jet flow is within the preset range or not, or whether the flow rate of inhibitor fluid is higher than the preset value or not (Step S219). When the laser beam irradiation can be obstructed by means of the liquid jet flow or inhibitor fluid (YES at Step S219), the shutter is opened (Step S20).

In this embodiment, it may be so arranged that the control unit 16 transmits both a control signal for closing the shutter and a control signal for starting injection of inhibitor fluid in response to detection of an abrupt fall of the signal level of the ongoing irradiation signal. Alternatively, it may be so arranged that the control unit 16 is equipped with a timer and the operation of Step S218 is executed when a preset period of time has elapsed after the operation of Step S16.

In many cases, the period of time between the time when a signal for changing the flow rate of the liquid jet flow or a signal for starting injection of inhibitor fluid is transmitted and the time when the irradiation of the laser beam is actually obstructed may be longer than the period of time between the time when a signal for closing the shutter 18 is transmitted and the time when the shutter 18 is actually closed. However, these periods of time can vary depending on the actual configuration of the laser peening device 11 to be operated. With this embodiment, the shutter 18 can be so controlled to make the shutter 18 quickly cut off the laser beam and the irradiation of the laser beam onto the shutter 18 can be suppressed without using the shutter temperature sensor 36.

Sixth Embodiment

Figure 10:
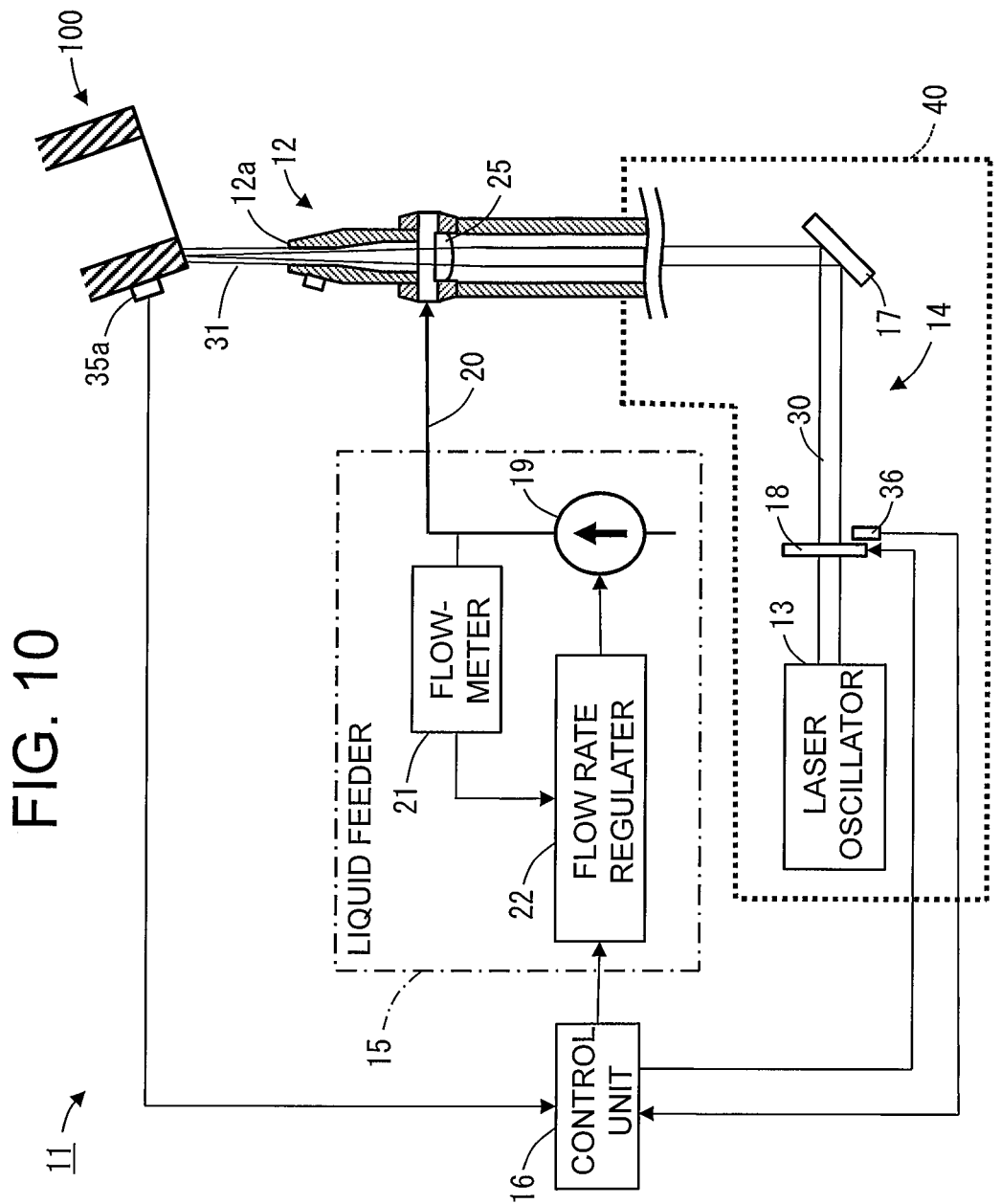
FIG. 10 is a schematic illustration of a sixth embodiment of a laser peening device according to the present invention, showing the configuration thereof.

FIG. 10 is a schematic illustration of a sixth embodiment of laser peening device according to the present invention, showing the configuration thereof. The sixth embodiment is obtained by modifying the first embodiment. A vibration sensor 35a is adopted for the ongoing irradiation sensor 35 of this embodiment and the vibration sensor 35a is rigidly secured to the target of laser peening (irradiation target 100). Otherwise, this embodiment is the same as the first embodiment.

The vibration that takes place in the target differs between an instance where a laser beam is irradiated onto the target under appropriate conditions and an instance where a laser beam is irradiated onto the target under conditions that are out of appropriate conditions. More specifically, as the conditions under which the laser beam is being irradiated are out of appropriate conditions, a certain frequency component or some frequency components of the vibration of the target become reduced. Thus, control operations similar to those of the first embodiment can be realized by using the intensity of the signal that indicates the vibration of the target at a certain wavelength or certain wavelengths as information on the ongoing laser beam irradiation.

The above-described first and second embodiments respectively employ an acoustic sensor and an optical sensor for the ongoing irradiation sensor 35. However, the sound or the light that is sensed by the ongoing irradiation sensor 35 can adversely be affected by the noise due to atmosphere (such as water and surrounding gas) existing between the point of laser beam irradiation and the ongoing irradiation sensor 35. On the other hand, the sixth embodiment employs a vibration sensor 35a that is rigidly secured to the irradiation target 100. Since the vibration sensor 35a detects the vibration that is being transmitted in the irradiation target 100, it has less noise and is less affected by changes in the environment. Additionally, unlike the instance where an acoustic sensor or an optical sensor is employed, a vibration sensor 35a can be arranged on the back side surface of the irradiation target 100 when viewed from the irradiation nozzle 12, or, when the irradiation target 100 is cylindrical, on the inside surface of the irradiation target 100.

Other Embodiments

While a number of embodiments are described above, the characteristic features of two or more of the above-described embodiments may be combined and exploited for a single embodiment. For example, any of the above-described ongoing irradiation sensors 35 or 35a may selectively be employed depending on the environment of execution of laser beam irradiation and two or more of those different ongoing irradiation sensors may be arranged in a single embodiment and selectively operated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A laser peening device comprising:
a laser oscillator for generating a laser beam;
an irradiation nozzle for irradiating a laser beam onto an irradiation target disposed in a transparent liquid, the liquid allowing the laser beam to pass therethrough, in order to execute a laser peening operation on the irradiation target;
an optical transmission unit for transmitting the laser beam generated by the laser oscillator to the irradiation nozzle;
a shutter attached to the optical transmission unit so as to be opened and closed to arbitrarily block a transmission of the laser beam;
a liquid feeder for supplying the irradiation nozzle with liquid so as to cause the liquid to flow along an optical path of the laser beam running from the irradiation nozzle to the irradiation target;
an ongoing irradiation sensor for obtaining information on ongoing laser beam irradiation indicating whether the laser beam is being irradiated for execution of ongoing laser peening operation on the irradiation target;
a control unit for controlling the shutter according to the information on the ongoing laser beam irradiation obtained by the ongoing irradiation sensor; and
a shutter temperature sensor for detecting a temperature of the shutter, wherein
the control unit is configured to:
determine whether the laser beam is being irradiated for execution of the ongoing laser peening operation on the irradiation target or not on a basis of the information on the ongoing laser beam irradiation while the laser peening operation is being executed on the irradiation target by the laser beam irradiation, and control the shutter so as to close the shutter when the control unit determines that the laser beam is not being irradiated for the execution of the ongoing laser peening operation, and
the control unit is configured that, if the temperature of the shutter obtained by the shutter temperature sensor exceeds a predetermined upper limit value after closing the shutter, the control unit opens the shutter and, at the same time, blocks the laser beam by causing an inhibitor fluid that obstructs the transmission of the laser beam to intervene in the optical path of the laser beam running from the irradiation nozzle to the irradiation target.

2. The laser peening device according to claim 1, wherein
the liquid feeder includes a flow rate regulator for regulating a flow rate of the liquid that is being supplied; and
the control unit is configured that, when the temperature of the shutter obtained by the shutter temperature sensor exceeds the predetermined upper limit, the control unit produces the inhibitor fluid by changing the flow rate of the liquid that is being supplied by the liquid feeder to a flow rate greater than a normal flow rate or to a flow rate smaller than the normal flow rate.

3. The laser peening device according to claim 1, wherein
the irradiation nozzle is configured to inject the inhibitor fluid into the optical path running to the irradiation target;
the laser peening device further comprises an inhibitor fluid flow rate measuring instrument for measuring a flow rate of inhibitor fluid injected into the irradiation nozzle; and
the control unit is configured to cause the inhibitor fluid to be injected into the irradiation nozzle when the temperature of the shutter obtained by the shutter temperature sensor exceeds the predetermined upper limit and that it causes to cause the shutter to be opened when the flow rate of injected inhibitor fluid obtained by the inhibitor fluid flow rate measuring instrument exceeds a predetermined threshold value.

4. The laser peening device according to claim 1, wherein
the ongoing irradiation sensor is an acoustic sensor for detecting level of sound; and,
the control unit is configured to determine that the laser beam is no longer irradiated for the laser peening operation that is being executed on the irradiation target, when the level of a sound obtained by the ongoing irradiation sensor falls below a predetermined threshold value.

5. The laser peening device according to claim 1, wherein
the ongoing irradiation sensor is an optical sensor for detecting intensity of the laser beam irradiated onto and reflected by the irradiation target; and
the control unit is configured to determine that the laser beam is no longer irradiated for the laser peening operation that is being executed on the irradiation target, when an intensity of the laser beam obtained by the ongoing irradiation sensor falls below a predetermined threshold level.

6. The laser peening device according to claim 1, wherein
the ongoing irradiation sensor is a vibration sensor rigidly secured to the irradiation target, for detecting intensity of vibration of the irradiation target; and, the control unit is configured to determine that the laser beam is no longer irradiated for the laser peening operation that is being executed on the irradiation target, when an intensity of vibration obtained by the ongoing irradiation sensor falls below a predetermined threshold level.

* * * * *